US007716483B2

(12) United States Patent
Sozzani et al.

(10) Patent No.: US 7,716,483 B2
(45) Date of Patent: May 11, 2010

(54) METHOD FOR ESTABLISHING A COMMUNICATION BETWEEN TWO DEVICES

(75) Inventors: Fabio Sozzani, Vimodrone (IT); Roberto Valerio Sannino, Milan (IT); Guido Marco Bertoni, Cusano Milanino (IT); Gerardo Pelosi, Matera (IT); Pasqualina Fragneto, Milan (IT)

(73) Assignee: STMicroelectronics S.r.1, Agrate Brianza (IT)

( * ) Notice: Subject to any disclaimer, the term of this patent is extended or adjusted under 35 U.S.C. 154(b) by 950 days.

(21) Appl. No.: 10/990,319

(22) Filed: Nov. 16, 2004

(65) Prior Publication Data

US 2005/0125670 A1  Jun. 9, 2005

(30) Foreign Application Priority Data

Nov. 18, 2003  (EP)  .................................  03425738

(51) Int. Cl.
*H04L 9/32* (2006.01)
*H04L 9/08* (2006.01)

(52) U.S. Cl. ........................ 713/171; 713/155; 380/277; 380/278; 380/279

(58) Field of Classification Search .................. 713/155
See application file for complete search history.

(56) References Cited

U.S. PATENT DOCUMENTS

| | | |
|---|---|---|
| 5,987,128 A | 11/1999 | Baba |
| 6,131,090 A | 10/2000 | Basso, Jr. et al. |
| 6,249,873 B1 * | 6/2001 | Richard et al. .................. 726/4 |
| 6,560,581 B1 * | 5/2003 | Fox et al. ........................ 705/51 |
| 6,792,534 B2 * | 9/2004 | Medvinsky .................. 713/171 |
| 6,940,980 B2 * | 9/2005 | Sandhu et al. ............... 380/282 |
| 7,142,676 B1 * | 11/2006 | Hillier et al. ................. 380/278 |
| 7,181,620 B1 * | 2/2007 | Hur ............................. 713/171 |
| 7,366,900 B2 * | 4/2008 | Shambroom ................ 713/168 |
| 7,409,554 B2 * | 8/2008 | Ishibashi et al. ............. 713/175 |

(Continued)

FOREIGN PATENT DOCUMENTS

WO  WO 03/077498 A1  9/2003

OTHER PUBLICATIONS

Boneh, D., et al., "Identity-based Encryption from the Weil Pairing," in *Proceedings of the Annual International Cryptology Conference*, Santa Barbara, CA, Aug. 19-23, 2001, pp. 213-229.

(Continued)

*Primary Examiner*—Emmanuel L Moise
*Assistant Examiner*—Luu Pham
(74) *Attorney, Agent, or Firm*—Lisa K. Jorgenson; Thomas J. Satagaj; Seed IP Law Group PLLC

(57) ABSTRACT

A method establishes a communication between a first electronic device associated with a first trusted authority and a second electronic device. The method includes: making a first key available to the first device for the communication between the first authority and the first device. A second trusted authority, associated with the second device and distinct and autonomous with respect to the first authority, generates a second key in order to communicate with the second device. Furthermore, the method includes: making the second key available to the second device; and providing the first and second devices with a communication key, to be used communication between the first and second devices, through at least one of the first and second authorities.

32 Claims, 2 Drawing Sheets

U.S. PATENT DOCUMENTS

Figure 1:
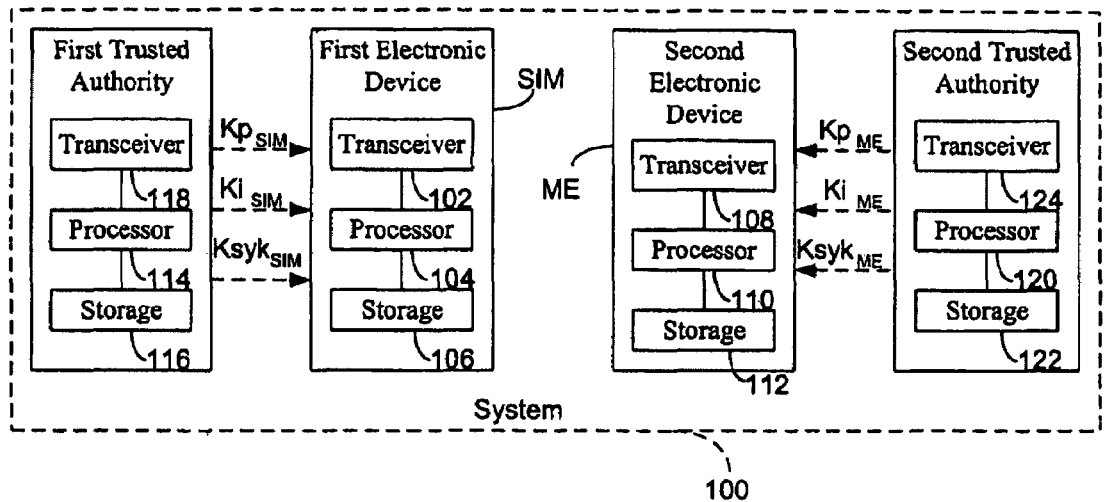

| | | | |
|---|---|---|---|
| 2003/0182554 A1 | 9/2003 | Gentry et al. | 713/171 |
| 2004/0019779 A1* | 1/2004 | Harrison et al. | 713/150 |
| 2004/0102183 A1* | 5/2004 | Haub et al. | 455/411 |
| 2004/0104097 A1* | 6/2004 | Ngee | 194/210 |
| 2004/0131191 A1* | 7/2004 | Chen et al. | 380/282 |
| 2005/0058294 A1* | 3/2005 | Chen et al. | 380/277 |
| 2005/0102512 A1* | 5/2005 | Goh et al. | 713/168 |
| 2005/0169464 A1 | 8/2005 | Sannino et al. | |

OTHER PUBLICATIONS

Yi, X., "Efficient ID-based Key Agreement from Weil Pairing," *Electronics Letters* 39(2):206-208, Jan. 23, 2003.

Amendment filed Oct. 23, 2008 in connection with U.S. Appl. No. 11/016,691, 19 pages.

Amendment filed Feb. 23, 2009 in connection with U.S. Appl. No. 11/016,691, 18 pages.

Office Action relating to U.S. Appl. No. 11/016,691, mailed Jul. 24, 2008, 30 pages.

Office Action relating to U.S. Appl. No. 11/016,691, mailed Dec. 23, 2008, 32 pages.

Office Action dated Jul. 7, 2009, relating to U.S. Appl. No. 11/016,691, 35 pages.

* cited by examiner

METHOD FOR ESTABLISHING A COMMUNICATION BETWEEN TWO DEVICES

BACKGROUND OF THE INVENTION

1. Field of the Invention

The present invention relates to a method for establishing a connection between electronic devices which allows the secure transmission of digital data.

2. Description of the Related Art

A large amount of digital data is currently transmitted, e.g., through mobile radio communication networks. In particular, portable electronic communication devices such as PDAs (small handheld computers) and the latest generation cell phones allow the direct downloading of suitable software, to be used in multimedia applications, from the internet. In such a way, each user may have access, at any time, to an increasing number of digitally provided services by connecting through such portable devices to appropriate remote internet servers by using the GSM, GPRS or UMTS mobile radio communications networks. Some of the services accessible for the user refer to, for example, multimedia commerce (m-commerce), banking operations (mobile banking) or simply access to Web sites.

Since the information which is transmitted between the portable devices and the remote servers is often sensitive and confidential, it is necessary to ensure its secrecy by resorting to cryptographic procedures or methods which make it inaccessible by unauthorized parties.

As is known, in the most versatile encryption methods, the information, or messages, to be transmitted are encoded through the use of two basic elements: a collection of fixed rules which constitute the cryptographic algorithm and one or more variable encryption keys. The algorithm is formed by encryption and decryption procedures which, normally, are identical to one another or are obtained by applying the same rules in an inverse order, but which may also be different. The keys are certain numbers, generally binary, or characters and, in general, are digital information. Such keys are used in order to encrypt/decrypt a clear/encrypted text thus obtaining an encrypted/clear text. Within the encryption methods currently in use, the cryptographic algorithm is known and the security of the transmission of encrypted data lies in the secrecy of the keys.

For example, in a symmetrical type encryption method, a single private or secret key is used both for encrypting and for decrypting the message to be transmitted. That assumes that the devices wishing to communicate in an encrypted manner must first exchange such private keys. Generally, the private key, generated in a random way, is exchanged through a side channel. The advantage of the private key method lies in the computational simplicity required in order to encrypt and decrypt messages.

The asymmetric, or public key encryption methods, provide the use of two distinct keys: an encryption key for encrypting the data to be transmitted and a decryption key for decrypting them. For such methods the encryption key is public, i.e., it is known or is easily obtainable from a public directory. Vice versa, the decryption key is private, i.e., secret. For example, in order to transmit a public key encrypted message to a receiver device, a sender device must encrypt that message with the receiver's known public key. The confidentiality of the message being sent is guaranteed in that only the receiver device will be able to decrypt the message by using its own private key.

Classic public key encryption methods have led to the conception of a standard security architecture known as Public Key Infrastructure PKI, which ensures a good level of security in the communication between devices, for example over the Internet. In order to encrypt messages, the current PKI methods adopt a hybrid approach, i.e., they use the public key encryption method and the symmetrical type method, simultaneously. In particular, in the hybrid approach, a transmitting device uses the public key of a receiving device (which is known) in order to encrypt a random number, called the session key. Such a session key, sent in an encrypted way to the receiving device, represents a current secret key, used by the same transmitting device in order to symmetrically encrypt the entire message to be sent to the receiving device. In accordance with the symmetrical type encryption method, the receiving device may decrypt the message received only by using the same session key with which the message has been encrypted. In the case in question, the receiving device recognizes this correct decryption key, i.e., the session key obtained by decrypting, with its own private key, the encrypted session key obtained from the transmitting device.

Conveniently, the word "user" will also be used below to indicate the generic device which transmits and receives data in an encrypted manner.

The fundamental problem with public key encryption methods is ensuring the correct and unambiguous matching between any device or user which communicates with that method and its own public key. For this purpose, the PKI infrastructure introduces the role of the Certification Authority CA. The Certification Authority for an encrypted data transmission method is a supervisory body, exterior to every user, having means of data processing, databases and their own means of data transmission. The role of such an institute is to register the public key and the identity of each user in digital certificates, thus guaranteeing the authenticity of the keys and the registered identity in the aforementioned certificates. In particular, the Certification Authority CA guarantees the authenticity of the keys and identities, attaching to such information its own "digital signature" validatable and verifiable by whosoever draws the public key from the Authority CA itself. Furthermore, the certificates underwritten by the Authority CA are published in appropriate directories, which are made freely accessible. In this way, each user may freely have access to the public key of any other user.

It is useful to observe that within the PKI infrastructure, encrypted communication using keys is preceded by a step in which the devices which communicate must, initially, reciprocally identify and authenticate one another. Particularly, each device declares its own identity by establishing with the other a communication, based upon the reliability and impartiality of the Certification Authority CA. For example, prior to the real and proper encrypted communication, an initialization step is provided wherein each device autonomously generates its own public key and its own private key. The public keys of both devices are registered with the Certification Authority CA which transfers the corresponding authentication certificates to both devices. Such certificates are stored, together with the corresponding private key, in appropriate memories internal to such devices. During a subsequent authentication step, each device in question provides its own certificate to the other, verifies the validity of the certificate obtained, and extracts from it the public key of the other device with which it wishes to establish the encrypted communication.

For the PKI infrastructure, encrypted communication may be established only if all the users of the system recognize the authority of guarantee and supervision performed by the Certification Authority CA.

A more recent alternative to the PKI is the method which is based on identity, IBE (Identity Based Encryption). The IBE method also provides the use of a public key and a private key in order to encrypt and decrypt messages, respectively. In particular, the public key is obtained by starting from a string which indicates, in an unambiguous manner, the identity of each user which receives encrypted data using IBE (for example the users taxation code), whilst the corresponding private key is provided to each user by a central authority denominated the Trusted Authority TA. The authority TA defines and makes public their own rules, i.e., for example, the mathematical functions or parameters, with which the Authority TA itself generates the encryption and decryption keys. On the basis of such rules and through a secret master key, the Trusted Authority TA generates the private key of each user starting from the corresponding identity of the user. Subsequently, this private key is transmitted to the corresponding user so that it may be stored within an internal memory of the latter, which is normally an electronic device.

The Trusted Authority TA structurally comprises means for data processing and databases in which, if necessary, the private keys assigned and transmitted to the users communicating encryptedly, are stored.

It is worthy to observe that the Trusted Authority TA does not certify the public keys which are directly obtainable from the identities of the users. Thus, each device which communicates through the IBE method must only store its own private key with a substantial saving in memory occupation.

Furthermore, with the IBE method, the authentication step between the devices is implicit: if a device can decrypt the message sent to it, it is automatically authenticated.

In addition, with the IBE method it is simpler, with respect to PKI, to create a public key having finite time duration, i.e., associated with an issue date. In other words, after a prearranged date, all the messages encrypted with that key will be considered to be out of date, therefore they may no longer be decrypted other than by using a new private key corresponding to a new period of validity.

Finally, the Trusted Authority TA database should always be accessible to the Police authorities. In such a manner it is possible to know, at any time, the private key of each user of the system and, in the case of necessity, decrypt their messages.

The transmission of encrypted data using keys has become an unremitting need within various fields, such as, for example, in the case of mobile telephony.

It is important to observe that the present generation of cellular phones are proper electronic platforms comprising different subsystems such as, for example, a mobile equipment, a smart card or a removable memory device.

Ultimately, it is desirable that each of such subsystems may establish encrypted communications, both with another subsystem of the same cellular phone and with another generic device such as, for example, a remote internet server.

Currently, encrypted communication between a mobile equipment and a smart card is not available.

Indeed, such devices are produced and sold by companies which are independent of one another (for example the mobile equipment manufacturing company and the mobile telephony service operator) which have different, and in some cases conflicting, market interests.

Accordingly, each of those companies accepts only limited exchange of the information contained within their own databases with others, such as for example the identification codes of the devices produced by them. Hence, the reciprocal identification and authentication steps of devices in communication, indispensable in order to achieve correct encrypted communication, are compromised.

In addition, such companies do not accept that an outside supervisory authority, such as the PKI architecture Certification Authority CA, may administer the encrypted communication protocol or the acquisition of sensitive and confidential data such as the public or private keys.

Finally, the method for transmitting encrypted data between the communicating subsystems must be transparent to the cellular phone user, i.e., they must not oblige such users to carry out complex operations.

BRIEF SUMMARY OF THE INVENTION

An embodiment of the present invention proposes a method for establishing an encrypted communication, using keys which are improved with respect to the known methods.

One embodiment of the invention is directed to method for establishing an encrypted communication by using keys, between an electronic first device associated with a trusted first authority and an electronic second device. The method includes:

making a first secret key available to the first device for the encrypted communication between the first authority and the first device, the first authority being able to generate the first secret key;

providing a trusted second authority, associated with the second device and distinct and autonomous with respect to the first authority, the second authority being able to generate a second secret key for the encrypted communication between the second authority and the second device;

making the second secret key available to the second device; and providing a communication key to the first and second devices to be used in said communication, through at least one of the first and second authorities.

BRIEF DESCRIPTION OF THE SEVERAL VIEWS OF THE DRAWING(S)

Figure 2:
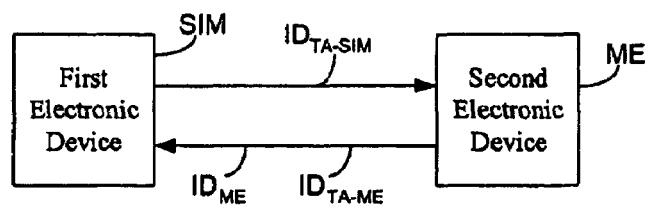
Figure 3A:
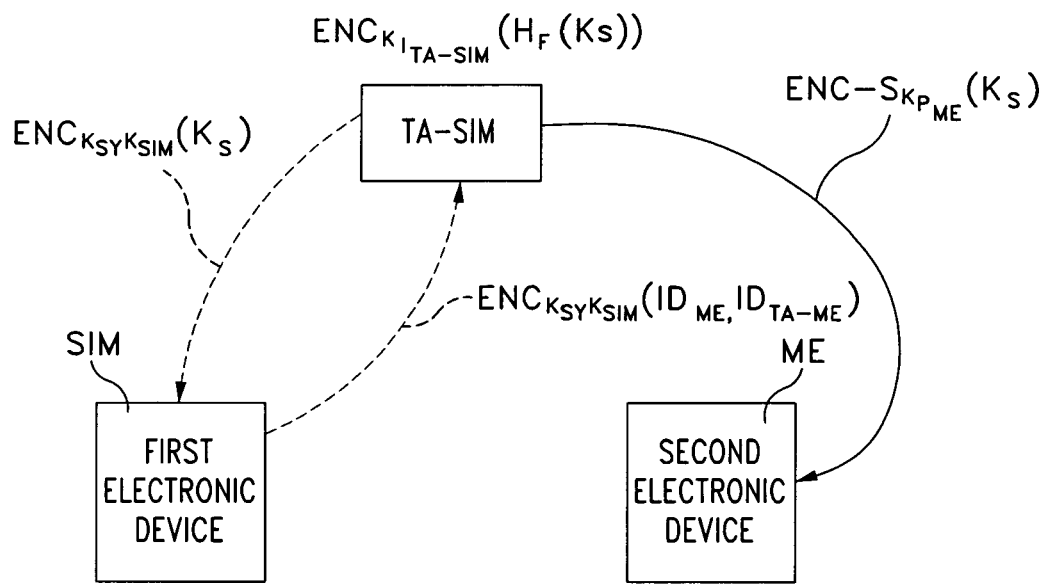
Figure 3B:
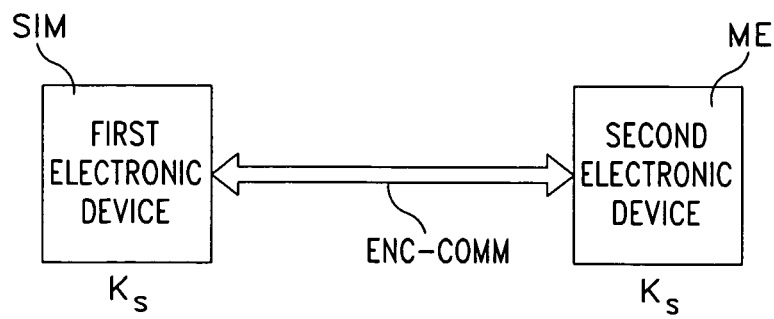

The characteristics and the advantages of the present invention will be understood from the following detailed description of one of its exemplary, and in no way limiting, embodiments in relation to the enclosed drawings, in which:

FIG. 1 is a schematic representation of an example of an encrypted communication system in accordance with the present invention;

FIG. 2 schematically represents a step of identity exchange between the devices, in order to have encrypted communication, in accordance with the present invention;

FIGS. 3a and 3b schematically show one preferred embodiment of the method of the invention in relation to the generation of secret keys.

DETAILED DESCRIPTION OF THE INVENTION

It is appropriate to premise that some of the steps of the method of the invention provide encrypted communication using keys, which may be carried out by using a symmetrical, or private key type method, or through an asymmetric type identity based method, IBE. These two methods have general characteristics and properties, which are known to those skilled in the art and in accordance with that described above.

In FIG. 1 a system 100 is schematically shown in accordance with the present invention and comprising a first electronic device SIM and a second electronic device ME intended for encrypted communication. According to one preferred embodiment to which reference will be made in the following description, the first electronic device SIM is a user identification module, i.e., a smart card containing the identifying data of the user and all other information which allows the user himself to make or receive telephone calls. Preferably, the second electronic device ME is a mobile equipment, i.e., a mobile telephone such as that which operates, for example, within the ambit of a cellular telephone system. Initially, the second device ME is devoid of any smart card.

It is observed that the present invention may be advantageously applied also to other types of electronic devices intended for encrypted communication. For example, such devices may be a smart card and a remote internet server.

The first device SIM includes a transceiver 102 for transmitting and receiving messages, a data processor 104, and a storage unit 106. Similarly, the second device ME includes a transceiver 108 for transmitting and receiving messages, a data processor 110, and a storage unit 112.

A first Trusted Authority TA-SIM and a second Trusted Authority TA-ME are associated with the first SIM and with the second ME electronic devices respectively. The first TA-SIM and the second TA-ME Authorities manage the acquisition of the public and private keys on behalf of the respective devices, they are physically distinct from one another and do not communicate with one another. In other words, the first TA-SIM and the second TA-ME Authorities each comprise a data processing system 114, 120, a database 116, 122, and means 118, 124 for transmitting such data which are distinct from those of the other. In the proposed example, the functions performed by the first TA-SIM and by the second TA-ME Trusted Authorities may be carried out directly by a mobile telephone operator and by a mobile electronic equipment manufacturing company, respectively.

Furthermore, the first TA-SIM and the second TA-ME Authorities may generate the keys to be associated with the corresponding device by using, for example, mathematical schemes which belong to the identity based cryptographic method, IBE. For example, one of such schemes is that of Boneh and Franklin, which is known to those skilled in the art. According to such a scheme, each Authority generates the aforementioned keys by using mathematical operations which involve functions and parameters which are common to both.

In particular, the collection of common functions and parameters is indicated by the notation $<G_1, G_2, ê, P, H, H_1>$ wherein, for example:

$G_1$ is an additive group of points of an algebraic curve;
$G_2$ is a finite multiplicative group;
ê is a bilinear function which associates an element of the group $G_2$ with each pair of elements of the additive group $G_1$;
P is a point of an algebraic curve, i.e., it is an element of the additive group $G_1$;
H and $H_1$ are, for example, hash type mathematical functions. In particular, the first hash function H, when applied to arbitrary strings, converts the latter into elements of the additive group $G_1$. The second hash function $H_1$, when applied to elements of the multiplicative group $G_2$ generates strings of bits of appropriate length.

In addition, the first TA-SIM and the second TA-ME Authorities also possess a first $S_{TA-SIM}$ and a second $S_{TA-ME}$ master key, respectively. Such first $S_{TA-SIM}$ and second $S_{TA-ME}$ master keys are generally distinct from one another, and each is kept secret from the other Trusted Authority.

Furthermore, it is observed that a first $ID_{SIM}$ and a second $ID_{ME}$ identities are associated with the first SIM and the second ME electronic device, respectively. Such first $ID_{SIM}$ and second $ID_{ME}$ identities are strings of bits or characters which unambiguously identify the aforementioned devices and do not represent confidential information in any way.

A method for establishing an encrypted communication between the first SIM and the second ME devices, in accordance with one embodiment of the invention, will now be described below.

The method comprises an initialization procedure, during which each Trusted Authority generates the public and private keys associated with the corresponding device.

In greater detail, the first Trusted Authority TA-SIM generates (and may store in one of its own appropriate memories) a first public key $KP_{SIM}$ associated with the first device SIM. In particular, such a first public key $Kp_{SIM}$ is obtained through processings or calculations which provide the application of the first mathematical hash function H to the first identity $ID_{SIM}$. Analogously, the second Trusted Authority TA-ME generates (and may store in one of its own memories) a second public key $Kp_{ME}$, associated with the second device ME, by applying the same first mathematical hash function H to the second identity $ID_{ME}$. Furthermore, a further first $ID_{TA-SIM}$ and a further second $ID_{TA-ME}$ identities are associated with the first TA-SIM and with the second TA-ME Authorities, respectively.

During the initialization procedure, in the first SIM device (in particular, in one of its appropriate memories) the further first identity $ID_{TA-SIM}$ and the characteristic parameters of the first Authority TA-SIM are stored.

Similarly, in the second ME device are stored (in particular, in a corresponding memory) the further second identity $ID_{TA-ME}$ and the characteristic parameters of the second Authority TA-ME.

The first TA-SIM and the second TA-ME Authorities apply the first $S_{TA-SIM}$ and the second $S_{TA-ME}$ master keys to the first $Kp_{SIM}$ and to the second $Kp_{ME}$ public keys, respectively, in order to obtain a first $Ki_{SIM}$ and a second $Ki_{ME}$ intermediate key. The application operations of the master keys $S_{TA-SIM}$ and $S_{TA-ME}$ to the public keys $Kp_{SIM}$ and $Kp_{ME}$ are carried out, for example, in an analogous manner to that which occurs according to the conventional IBE method for the determination of private keys.

Such first $Ki_{SIM}$ and second $Ki_{ME}$ intermediate keys are private or secret keys associated with the first SIM and with the second ME device respectively, and stored within them. Such keys will be used for the encrypted transmission of particular messages (which will be discussed later) carried out according to the IBE method.

In greater detail, the operation which allows the procurement, for example, of the first intermediate key $Ki_{SIM}$ may be carried out in accordance with the following expression:

$$Ki_{SIM} = s_{TA-SIM} \cdot Kp_{SIM} \quad (1)$$

wherein, as will be apparent to those skilled in the art, the operator "·" represents an external product in additive group $G_1$. In particular, such external product is definable as follows:

$$x \cdot y \rightarrow z, \ x \in \{1, 2, \ldots, \text{ord}(G1)-1\} y, z \in G1; \qquad (2)$$

where "ord" is the number of elements of the group $G_1$.

Subsequently, the first TA-SIM and the second TA-ME Trusted Authorities generate first $Ksyk_{SIM}$ and second $Ksyk_{ME}$ secret keys by applying, for example, a further mathematical hash type function to the first $Ki_{SIM}$ and to the second $Ki_{ME}$ intermediate keys respectively. Such a further hash function is arbitrary and might be different for both Authorities.

The first $Ksyk_{SIM}$ and the second $Ksyk_{ME}$ secret keys allow the accomplishment of the symmetric, encrypted communication between each device and the corresponding Trusted Authority.

It is observed that the devices themselves might autonomously generate the first $Ksyk_{SIM}$ and the second $Ksyk_{ME}$ secret keys by starting from the first $Ki_{SIM}$ and from the second $Ki_{ME}$ intermediate keys respectively, each and every time it is made necessary to communicate symmetrically with the respective Authority. Thus, storing such secret keys within the corresponding devices during the initialization step could be avoided.

Alternatively, the first $Ksyk_{SIM}$ and the second $Ksyk_{ME}$ secret keys may be directly pre-arranged by each Authority and assigned to the corresponding device, without carrying out any processing of the intermediate keys.

In particular, the first Trusted Authority TA-SIM associates the first pre-arranged secret key $Ksyk_{SIM}$ with the first device SIM and the latter stores it within its own memory (STORE1) as shown schematically in FIG. 1.

Analogously, the second Trusted Authority TA-ME associates the second secret key $Ksyk_{ME}$ with the second device ME so that the latter stores it internally in a second memory (STORE2).

For example, the mobile telephone service operator could manufacture their own smart cards by storing the corresponding secret key $Ksyk_{SIM}$ inside each of them. Or, such a secret key might not be initially stored within each smart card, but each smart card could generate it whenever necessary. It is observed that such secret keys are different for each smart card.

The initialization procedure described could come about, for example, during the final manufacturing steps of the devices, i.e., prior to these becoming available to the end users.

So that an encrypted communication using keys may be established between the first SIM and the second ME devices, it is necessary, first of all, that such devices be connected.

In particular, the connection between the two devices is direct when, for example, the smart card is inserted within the mobile equipment in such a manner that the first SIM and the second ME devices are in electronic contact with one another. Alternatively, the connection between the first SIM and the second ME device may take place over some distance through appropriate transmission means (for example mobile radio communications networks).

In some applications, it may be expedient that the devices which are connected to one another, forward a message to their respective Trusted Authorities which allows the Authorities themselves to identify them. For example, a smart card inserted inside a mobile telephone sends its own identity, in clear, to its own cellular telephone network service operator.

Subsequently, upon connection, the second device ME sends its own second identity $ID_{ME}$ and the further second identity $ID_{TA-ME}$ of the second Authority TA-ME to the first device SIM. Instead, such first device SIM only sends the further first identity $ID_{TA-SIM}$ of the first Authority TA-SIM to the second device ME. Such a step is shown schematically in FIG. 2.

Following such an exchange of identities, the second device ME does not recognize precisely with which first device SIM it is about to establish an encrypted communication using a session key, but recognizes the Trusted Authority associated with such a device, i.e., in the example under consideration, the mobile telephone network operator.

Following the sending of the aforementioned identity, the method comprises steps for the generation of session keys, which are usable by the first SIM and by the second ME device as secret keys in order to establish an encrypted communication between themselves. In other words, such secret session keys will be used, during a communication session, in order to encrypt and decrypt all the subsequent messages exchanged between the two devices.

In particular, with reference to FIG. 3a, one preferred embodiment of the generation of the secret session keys, in accordance with the invention, will be described. In the case in point, it is hypothesized that the generation of the secret session keys involves, besides the first SIM and the second ME device, a single Trusted Authority, for example, the first Authority TA-SIM. That corresponds to assigning control over the secret session key generation step to the first Authority TA-SIM (or, according to the example proposed, to the mobile telephone network operator).

Alternatively, the second Authority TA-ME could assume control over the session key generation step. In such a case, in the preceding identity exchange step, the second device ME would only send the further second identity $ID_{TA-ME}$ to the first device SIM. The first device SIM would send the first $ID_{SIM}$ and the further first $ID_{TA-SIM}$ identities to the second device ME.

It is observed that if the first Authority TA-SIM has been able to identify its own first device SIM, for example, by receiving the identity of the latter "in clear", symmetrically encrypted messages can be transmitted between the first device SIM and the corresponding first Trusted Authority TA-SIM. Indeed, the first Authority TA-SIM shares the first secret key $Ksyk_{SIM}$ with the first device SIM. For example, the first device SIM symmetrically uses such a secret key $Ksyk_{SIM}$, in order to encrypt a message to be transmitted to the first Authority TA-SIM. The first Authority TA-SIM deciphers such a message by using the same key.

It is observed that, as it is self-evident for those skilled in the art, the method of the invention may include the transmission of further information in addition to that contained within the messages which will be explicitly described in the following. In relation to FIG. 3a, the first device SIM transmits a message containing the second identity $ID_{ME}$ and the further second identity $ID_{TA-ME}$, which the first device SIM has itself received from the second device ME in the preceding step, to the first Authority TA-SIM. Prior to being transmitted, the aforesaid identities are encrypted using the first secret key $Ksyk_{SIM}$ in such a manner that the first Authority TA-SIM may decrypt them with the same key, in accordance with the aforementioned symmetrical encryption method.

In greater detail, the message which is transmitted contains the identities encrypted in accordance with the following notation, which is also indicated in FIG. 3a:

$$ENC_{Ksyk_{SIM}}(ID_{ME}, ID_{TA-ME}) \qquad (3)$$

wherein, by ENC is indicated the encryption operation carried out on the second $ID_{ME}$ and on the further second $ID_{TA-ME}$ identities, using the key $Ksyk_{SIM}$. Such an encryption operation is carried out in accordance with the pre-selected, symmetrical key cryptography algorithm.

The first Authority TA-SIM decrypts the message received in accordance with the notation (not shown in FIG. 3a)

$$DEC_{Ksyk_{sim}}(ENC_{Ksyk_{sim}}(ID_{ME}, ID_{TA-ME})) \qquad (4)$$

wherein, with DEC is indicated the decryption operation carried out on (3) by using the key $Ksyk_{SIM}$. Such a decryption operation allows the first Authority TA-SIM to recognize (i.e., store in an appropriate memory) the second $ID_{ME}$ and the further second $ID_{TA-ME}$ identities. In other words, the first Authority TA-SIM is informed about the typology of the second device ME (for example the type of mobile communication equipment) and about other data relating to the second Authority TA-ME. In particular, after having acquired the second identity $ID_{ME}$, the first Authority TA-SIM is able to generate (and therefore to store) the second public key $Kp_{ME}$ associated with the second device ME. In greater detail, the first Authority TA-SIM applies the first hash function H (common to both Authorities) to the second identity $ID_{ME}$ in order to generate said public key $Kp_{ME}$.

Alternatively to the symmetrical method, the encryption and decryption operations associated with the transmission of the second $ID_{ME}$ and with the further second $ID_{TA-ME}$ identities may be carried out by using the IBE asymmetrical method. In such a case, the encryption key used is a further first public key $Kp_{TA-SIM}$ associated with the first Authority TA-SIM. The first device SIM generates such a public key $Kp_{TA-SIM}$ by applying the first hash function H to the further first identity $ID_{TA-SIM}$.

In order to decrypt the message containing the second $ID_{ME}$ and the further second $ID_{TA-ME}$ identities, the first Authority TA-SIM uses a further first intermediate key $Ki_{TA-SIM}$.

In a manner which is analogous to (1), this latter key is obtained by multiplying such a further public key $Kp_{TA-SIM}$ by the first master key $S_{TA-SIM}$.

It is observed that the message containing the identities $ID_{ME}$ and $ID_{TA-ME}$ may also be encrypted according to the encryption methodologies which characterize the GSM (Global System for Mobiles) transmission standard. In particular, such a transmission standard provides that each user of the mobile radio communications network (identified by the corresponding cellular telephone smart card) and the corresponding mobile telephone system operator (which in the example proposed, coincides with the Trusted Authority TA-SIM) may symmetrically exchange encrypted information by using an additional session key, or GSM session key Kc, common to both.

As is known to those skilled in the art, the session key Kc is generated following a user authentication step wherein a "challenge-response" type mechanism is used. Such an authentication step comes about every time a user, whilst entering into an MSC (Mobile services switching center) zone, requests the ability to access the network. If the authentication step has a positive outcome, the user and the operator each generate, on their own behalves, the session key Kc by using an algorithm (known as A8) having a secret key Ki and a random number RAND as input.

In particular, the secret key Ki is stored both within the smart card and in one of the GSM network operator's memories, whilst the random number RAND is generated by the operator itself in order to be transmitted to the user over the airwaves in clear.

As is known, the session key Kc is not exchanged between the user and the operator over the air and is used until the switching center MSC decides to authenticate the user once again.

In the case in question, the message containing the $ID_{ME}$ and $ID_{TA-ME}$ identities is encrypted using the session key Kc using a GSM encryption algorithm (known as A5).

Subsequently, the first Authority TA-SIM generates a secret session key Ks which is encrypted using the first secret key $Ksyk_{SIM}$ in order to be sent as a message to the first device SIM. The message which is sent contains the session key Ks, encrypted symmetrically in accordance with the following notation (analogous in type to notation (3)), which is also indicated in FIG. 3a:

$$ENC_{Ksyk_{SIM}}(Ks) \qquad (5)$$

The message, in accordance with notation (5), is received and decrypted (with the same secret key $Ksyk_{SIM}$) by the first device SIM. This takes place in accordance with the following notation (analogous to (4) and itself also not indicated in FIG. 3a)

$$DEC_{Ksyk_{SIM}}(ENC_{Ksyk_{SIM}}(Ks)) \qquad (6)$$

It is observed that if the first device SIM is able to decrypt such a message received from the first Authority TA-SIM, with the first secret key $Ksyk_{SIM}$, it is automatically authenticated, i.e., it is not possible that a clone is substituting it.

In such a manner, the first device SIM may recognize (and store in an appropriate memory) the secret session key Ks.

Alternatively, the encryption and decryption operations associated with the transmission of the session key Ks to the first device SIM, may be carried out, not according to the symmetrical method, but by using the IBE type asymmetrical method. In such a case, the encryption key used is the first public key $Kp_{SIM}$ and the decryption key is the first intermediate key $Ki_{SIM}$. Both these keys are known to the first Authority TA-SIM in as much as they have been generated by it itself.

Furthermore, the message containing the session key Ks may also be encrypted in accordance with the aforementioned GSM standard encryption method.

Advantageously, the first Authority TA-SIM sends the same session key Ks to the second device ME, encrypting it with the second public key $Kp_{ME}$ in accordance with the asymmetric IBE method.

However, it is observed that in this case the encryption operation also includes an electronic signature of the message sent.

For the calculation of the signature, the first Authority TA-SIM, besides generating the secret session key Ks, applies a hash function $H_F$ to the latter, in such a manner as to obtain a digest $H_F(Ks)$ of the aforesaid key. Such a hash function $H_F$ may coincide with the first H or with the second hash function $H_1$, introduced previously, or may be a different hash function. However, the devices and the Authorities must be in agreement regarding the use of the same function $H_F$ for the calculation of the digest.

The digest $H_F(KS)$ is encrypted with the further first intermediate key $Ki_{TA-SIM}$ thus obtaining the digital signature of Ks indicated in the following with:

$$ENC_{Ki_{TA-SIM}}(H_F(Ks)) \qquad (7)$$

The message sent to the second device ME is in accordance with the following notation, (also indicated in FIG. 3a):

$$ENC\text{-}S_{Kp_{ME}}(Ks) \qquad (8)$$

and is equivalent to:

$$ENC_{Kp_{ME}}(Ks, ENC_{Ki_{TA-SIM}}(H_F(Ks))) \quad (9)$$

The message (9) contains both the session key Ks and the signature appended by the TA-SIM according to the notation (7) and both are encrypted using the second public key $Kp_{ME}$ of the second device ME.

The second device ME decrypts (9) by using the second intermediate key $Ki_{ME}$ in accordance with the notation:

$$DEC_{Ki_{ME}}(ENC_{Kp_{ME}}(KS, ENC_{Ki_{TA-SIM}}(H_F(Ks)))) \quad (10)$$

so that it may recognize and store the session key Ks. By starting from such session key Ks, the second device ME autonomously calculates the digest $H_F(Ks)$.

Subsequently, the same device ME verifies the TA-SIM signature of (7) by using the further first public key $Kp_{TA-SIM}$ of the first Authority TE-SIM which it recognizes in as much as it can calculate it directly by starting from the further first identity $ID_{TA-SIM}$ which is public. That comes about in accordance with the notation (not indicated in FIG. 3):

$$DEC_{Kp_{TA-SIM}}(ENC_{Ki_{TA-SIM}}(H_F(Ks))) \quad (11)$$

It is observed that the decryption operation (11) comes about in accordance with the property of interchangeability in the use of the public and private keys within the IBE method. Such a property is known to any person skilled in the art.

Following on from (11), the second device ME recognizes the digest $H_F(Ks)$ sent to it by TA-SIM.

It is observed that if the second device ME is able to decrypt (9) received from the first Authority TA-SIM, it is automatically authenticated, i.e., it is not a clone. Furthermore, if the transmission of the session key Ks between the first Authority TA-SIM and the second device ME has occurred without any errors, then the digest calculated and the digest received are the same.

As a consequence of the exchange of messages described, both the devices recognize the secret session key Ks simultaneously.

Advantageously, such a secret session key Ks is used in order to establish a symmetrical encrypted communication ENC-COMM between the first SIM and the second ME device, in accordance with FIG. 3b.

The transmission of data, carried out symmetrically, is advantageous because it is less wasteful in computational terms and requires fewer resources in terms of the power of the devices involved in the communication, with respect to an asymmetric type communication.

It is observed, furthermore, that both the cryptography algorithms and the method procedures with which the various cryptographic keys are generated are implemented in hardware, software or hybrid procedures, i.e., by combining both the previous procedures. In particular, the algorithms or the software implemented method procedures are contained within memory storage belonging to the Trusted Authorities or the first SIM and the second ME device. The hardware-type procedures are implemented through appropriate electronic circuitry.

For example, in correspondence with a Trusted Authority in which there are no dimensional or power dissipation limitations, such procedures may be implemented in a hardware manner, i.e., by integrating with electronic circuitry. On the contrary, within the individual devices (SIM or ME) wherein the former limitations are considerable, it is preferable to implement the method algorithms and the procedures through software.

It is useful to observe that the secret session key Ks generated may be pertinent to every specific communication session between the devices. Such key Ks may be calculated in correspondence to every new communication session, such as, for example, due to the switching on again of the cellular telephone.

Furthermore, such key Ks may be changed during the same communication session and due to the refreshing of the identity by the first TA-SIM and the second TA-ME Authorities (for example, when a date is associated with the identity).

One significant advantage of the method of the invention is connected with the presence of the two distinct Trusted Authorities TA-SIM and TA-ME associated with the first SIM and the second ME devices, respectively.

Advantageously, such Authorities autonomously manage the initialization step of the corresponding devices. In such a manner, the device manufacturing companies which communicate in an encrypted manner are not obliged to share their own databases and their own confidential information as in the case wherein there is a single outside supervising Authority.

However, subsequent to the authentication step of the devices, it may be expedient to use only one of such Trusted Authorities in order to generate the session key Ks. That results in a significant saving from the computational point of view, and reduces the amount of information which the individual devices must exchange with the Authorities. Indeed, if both the Authorities concur at least partly in creating such session keys Ks, then they must generate distinct parts of such keys to be sent (each on their own behalf to both the devices. Subsequently, such distinct parts must be processed by the devices themselves in order to generate the session key Ks with excessive complexity in the calculation and expenditure of power.

It is observed that the use of an identical secret session key for both devices allows the exploitation of all the advantages of symmetrical communication.

Furthermore, with the sharing of databases between the Trusted Authorities not being necessary, the method described is particularly versatile in as much as it may be used in the transmission of data in an encrypted manner conforming to different standards of communication such as, for example, the GSM standard, the OMA (Optical Modulation Amplitude) standard or the third generation wireless communication standard 3GPP (3G Project Partnership).

It is observed that if one of the two electronic devices is not authentic, i.e., it is a clone, then the encrypted communication may not take place. Indeed, such a device would not have the secret keys such as, for example, the key $Ksyk_{SIM}$ and the key $Ki_{SIM}$, with which to complete the protocol.

In addition, the described method activates automatically whenever it is necessary to establish encrypted communication between two devices, i.e., it does not involve the end user of the devices in any way.

Finally, subsequent to the establishment of the encrypted communication between the first SIM and the second ME device, with an appropriate session key Ks, the method of the invention may be repeated. In other words, each of the two devices is able to establish a new encrypted communication with another device (e.g., remote) by using a new secret session key Ks' distinct from Ks.

Obviously, in order to accomplish an encrypted communication by using the keys of the present invention, an expert in the art, with the aim of satisfying contingent and specific requirements, might bring about additional modifications and variations to the method, all moreover contained within the scope of protection of the invention, such as defined by the following claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method comprising:
    establishing an encrypted communication by using keys, the encrypted communication between a first electronic device associated with a first trusted authority and a second electronic device associated with a second trusted authority, the establishing including:
    providing a first identity associated with the first electronic device, a second identity associated with the second electronic device, a further first identity associated with the first trusted authority, and a further second identity associated with the second trusted authority;
    making a first secret key associated with the first electronic device available to the first electronic device for encrypted communication between the first trusted authority and the first electronic device, said first trusted authority being able to generate the first secret key;
    making a second secret key available to the second electronic device, the second trusted authority being able to generate the second secret key for encrypted communication between the second trusted authority and the second electronic device;
    making available the second identity and the further second identity to the first electronic device upon connection of the second electronic device with the first electronic device;
    transmitting a message by the first electronic device to the first trusted authority, said message containing the second identity and the further second identity, wherein the message is encrypted with the first secret key;
    generating by the first trusted authority a public key associated with the second electronic device, said public key generated from the received second identity;
    generating by said first trusted authority a communication key to be used in a communication between said first electronic device and said second electronic device;
    sending by the first trusted authority a first message to the first electronic device, said first message containing the communication key, wherein the first message is encrypted with the first secret key; and
    sending by the first trusted authority a second message, different than the first message, to the second electronic device, said second message containing the communication key, wherein the second message is encrypted with the public key associated with the second device;
    wherein the second electronic device is not associated with the first trusted authority and the first electronic device is not associated with the second trusted authority and the second trusted authority is distinct and autonomous with respect to the first trusted authority.

2. The method according to claim 1, further comprising generating, by the one of said trusted authorities, an electronic signature by starting from said communication key.

3. The method according to claim 2 wherein the communication key and the electronic signature are encoded in accordance with an identity based encryption method.

4. The method according to claim 1 wherein communication key sent to the first electronic device is encoded in accordance with a symmetrical type encryption method or in accordance with an asymmetric identity based encryption method.

5. The method according to claim 4 wherein said symmetrical encryption method is a global system for mobile (GSM) communication standard encryption method.

6. The method according to claim 1, further comprising:
    sending the further first identity to the second electronic device, by the first electronic device; and
    sending the second identity and the further second identity to the first electronic device, by the second electronic device.

7. The method according to claim 1 wherein the transmission of the second identity and the transmission of the further second identity by the first electronic device to the first trusted authority is carried out symmetrically using the first secret key or by using a session key in accordance with a global system for mobile (GSM) communication standard.

8. The method according to claim 1 wherein the transmission of the second identity and the transmission of the further second identity by the first electronic device to the first trusted authority is carried out by using an identity based encryption method and by using a further first public key obtained by staffing from the further first identity associated with the first trusted authority and a further first intermediate private key in turn obtained by staffing from the further first public key.

9. The method according to claim 1 wherein said first electronic device is an integrated circuit card and the second device is a mobile telephone or a remote internet server.

10. An encrypted communication system using keys, the system comprising:
    a first electronic device associated with a first trusted authority, the first electronic device configured to:
    receive a first secret key from the first trusted authority;
    transmit a second identity and a further second identity to the first trusted authority;
    receive a first message having a communication key, the first message encrypted with the first secret key;
    a second electronic device associated with a second trusted authority and not associated with said first trusted authority, the first electronic device not associated with said second trusted authority, and the second trusted authority is distinct and autonomous with respect to the first trusted authority, the second electronic device configured to:
    receive a second secret key from the second trusted authority;
    receive a second message having the communication key, the second message encrypted with a public key, the second message received from the first trusted authority, the second message different than the first message; and
    communication means for having an encrypted communication between the first electronic device and the second electronic device using the communication key to encrypt the communication,
    wherein said communication key is generated and sent by only said first trusted authority.

11. The system of claim 10 wherein the communication key is received by the first electronic device in encrypted form, and the first electronic device further includes decoding means for decoding the encrypted communication key using the first secret key.

12. The system of claim 10 wherein the second electronic device includes means for transmitting an identifier to the first electronic device and the first electronic device includes means for transmitting the identifier to the first trusted authority to enable the first trusted authority to generate a public key from the identifier and encode the communication key using the public key.

13. The system of claim 10 wherein said first electronic device is an integrated circuit card and the second electronic device is a mobile telephone or a remote internet server.

14. A method for establishing an encrypted communication between a first electronic device associated with a first trusted authority and a second electronic device associated with a second trusted authority, the method comprising:
receiving at the first electronic device a first secret key from the first trusted authority, said first electronic device not being associated with said second trusted authority;
using the first secret key for encrypted communication between the first electronic device and the first trusted authority;
receiving at the second electronic device a second secret key from the second trusted authority, said second electronic device not being associated with said first trusted authority;
using the second secret key for encrypted communication between the second electronic device and the second trusted the authority;
making available the second identity and the further second identity to the first electronic device or making available the first identity and the further first identity to the second electronic device upon connection of the second electronic device with the first electronic device;
transmitting the second identity and the further second identity by the first electronic device to the first trusted authority or transmitting the first identity and the further first identity by the second electronic device to the second trusted authority;
receiving at the first electronic device, a first message having a communication key, the first message encrypted with the first secret key or a first public key, the first message received from only one of the first trusted authority or the second trusted authority respectively;
receiving at the second electronic device, a second message having the communication key, the second message encrypted with a public key or the second secret key, the second message received from the only one of the first trusted authority or the second trusted authority respectively, the second message different than the first message; and
using the received communication key for encrypted communication between the first and second electronic devices.

15. The method of claim 14, further comprising receiving at the second electronic device an electronic signature created from the communication key by the first trusted authority.

16. The method of claim 14 wherein the receiving the communication key at the first electronic device includes receiving the communication key in an encrypted message, the method further comprising decoding the encrypted message using the first secret key.

17. The method of claim 14, further comprising:
transmitting an identifier from the second electronic device to the first electronic device; and
transmitting the identifier from the first electronic device to the first trusted authority to enable the first trusted authority to generate a public key from the identifier and encode the communication key using the public key.

18. The method of claim 14 wherein the communication key is received by the first electronic device in encrypted form and the method further comprises decoding the encrypted communication key in accordance with a symmetrical type decryption method or in accordance with an asymmetric identity based decryption method.

19. The method of claim 14 wherein first and second electronic device identities are associated with the first and the second electronic devices, respectively and first and second trusted authority identities are associated with the first and the second electronic devices, respectively; the method further comprising:
sending the first trusted authority identity from the first electronic device to the second electronic device; and
sending the second electronic device identity and the second trusted authority identity from the second electronic device to the first electronic device.

20. The method of claim 19, further comprising transmitting, in encrypted form, the second electronic device identity and the second trusted authority identity from the first electronic device to the first trusted authority.

21. The method of claim 20 wherein the transmitting is carried out symmetrically using the first secret key or by using a session key in accordance with a global system for mobile (GSM) communication standard.

22. The method of claim 20 wherein the transmitting is carried out by using an identity based encryption method and by using a further first public key obtained from the first trusted authority identity and an intermediate private key received from the first trusted authority.

23. The method of claim 14 wherein the first electronic device is an integrated circuit card and the second electronic device is a mobile telephone or a remote internet server.

24. The method of claim 14 wherein said second electronic device is a Universal Mobile Telecommunications System (UMTS) portable electronic communication device.

25. The method of claim 14 wherein said second electronic device is a General Packet Radio Service (GPRS) portable electronic communication device.

26. A trusted authority device comprising:
a transceiver configured to:
receive a first identity from a first device, the first identity associated with the first device, the first device associated with the trusted authority; and
receive a second identity and a second further identity from the first device, the second identity associated with a second device and the further second identity associated with a second trusted authority device,
wherein the second device is not associated with the trusted authority device and the first device is not associated with the second trusted authority device and the second trusted authority device is distinct and autonomous with respect to the trusted authority device;
a processor, the processor configured to:
generate a secret key from the first identity,
generate a public key from the second identity, and
generate a communication key from the first identity and the second identity,
wherein the communication key is useful to encrypt and decrypt communication between the first device and the second device; and
a storage unit configured to:
store the secret key,
store the public key and
store the communication key; and
wherein the transceiver is further configured to:
transmit a first message to the first device, the first message having the communication key, wherein the first message is encrypted with the secret key, and transmit a second message to the second device, the second message different than the first message, the second message having the communication key, wherein the second message is encrypted with the public key.

27. The trusted authority device of claim 26 wherein the first device is a smart card and the second device is a mobile telephone.

28. The trusted authority device of claim 26 wherein the communication key is encoded in accordance with a symmetrical type encryption method.

29. The trusted authority device of claim 28 wherein the symmetrical encryption method is a global system for mobile (GSM) communication standard encryption method.

30. The trusted authority device of claim 26 wherein the communication key is encoded in accordance with an asymmetric identity based encryption method.

31. The trusted authority device of claim 26 wherein the processor is further configured to generate a second communication key and the transceiver is further configured to transmit a third message to the first device, the third message having the second communication key encrypted with first secret key, and a fourth message to the second device, the fourth message different than the third message, the fourth message having the second communication key encrypted with the first public key.

32. The trusted authority device of claim 31 wherein the processor is further configured to detect that at least one of the first identity or the second identity has been refreshed, said detection initiating generation of the second communication key.

* * * * *